United States Patent
Baker

(10) Patent No.: US 8,302,490 B2
(45) Date of Patent: Nov. 6, 2012

(54) APPARATUS AND METHOD FOR MEASURING RELATIVE SPEED BETWEEN A FLUID AND A REFERENCE

(76) Inventor: William E. Baker, Oceanside, CA (US)

(*) Notice: Subject to any disclaimer, the term of this patent is extended or adjusted under 35 U.S.C. 154(b) by 131 days.

(21) Appl. No.: 12/803,236

(22) Filed: Jun. 22, 2010

(65) Prior Publication Data

US 2011/0308327 A1    Dec. 22, 2011

(51) Int. Cl.
*G01F 1/20* (2006.01)
(52) U.S. Cl. .................................... 73/861.18
(58) Field of Classification Search .................. None
See application file for complete search history.

(56) References Cited

U.S. PATENT DOCUMENTS

| | | | | |
|---|---|---|---|---|
| 4,312,238 A | * | 1/1982 | Rey | 73/861.28 |
| 4,391,150 A | * | 7/1983 | Rey | 73/861.29 |
| 4,480,483 A | * | 11/1984 | McShane | 73/861.95 |
| 6,151,558 A | * | 11/2000 | Conant et al. | 702/48 |

* cited by examiner

*Primary Examiner* — Harshad R Patel
(74) *Attorney, Agent, or Firm* — Roy A. Ekstrand

(57) ABSTRACT

A pair of electro-acoustic transducers, one functioning as a speaker and the other functioning as a microphone, are operatively coupled to a reference which in turn is in communication with a fluid. A regenerative frequency filtering loop is operatively coupled between the transducers and functions to apply amplified signal to the speaker and produce an acoustic signal which propagates through the medium. The acoustic signal is sensed by the microphone and coupled to the regenerative loop input. For certain frequencies, the spacing between the transducers together with the speed of propagation of sound through the fluid combine with the frequency filtering of the regenerative loop to cause the loop to regenerate at a frequency indicative of the relative speed between the reference and the fluid.

13 Claims, 4 Drawing Sheets

APPARATUS AND METHOD FOR MEASURING RELATIVE SPEED BETWEEN A FLUID AND A REFERENCE

FIELD OF THE INVENTION

The present invention relates generally to the measurement of the relative fluid speed and particularly to the measurement of the relative speed of motion between a fluid and a reference. The present invention relates still more particularly to measurement of the relative speed of motion between a vehicle and a fluid environment.

BACKGROUND OF THE INVENTION

The need for measuring the relative speed between a fluid and an object arises in a substantial number of environments. For example, the relative speed of a fluid through a pipe is often of significant importance in manufacturing processes and the like. By way of further example, the relative speed of an object such as a vehicle or vessel through a fluid such as air or water is often of interest. Thus, aircraft traveling through the air and watercraft traveling through or upon the water create a need for measurement of the speed of the aircraft or watercraft relative to the air or water in which they move.

To meet the need for measuring relative speed between a fluid and a reference, practitioners in the art have created a variety of systems and apparatus. Most such system utilize some element which engages the fluid of interest and which is acted upon by the fluid due to its relative motion.

In a common type of relative speed measurement, aircraft often employ a capture tube and pressure gage combination to measure aircraft speed relative to the air through which they are traveling. Also, many systems used in aircraft and watercraft provide a rotatable propeller or the like which engages the air or water within the environment and which is rotated thereby during motion.

While the various types of fluid-engaging measurement systems heretofore provided have, to some extent, functioned satisfactorily and have, in some instances, enjoyed commercial success, there remains nonetheless a continuing need in the art for ever more improved relative speed measurement apparatus and systems which function without the need of directly engaging the fluid of interest.

SUMMARY OF THE INVENTION

Accordingly, it is a general object of the present invention to provide an improved apparatus and method for measuring relative speed between a fluid and a reference. It is a more particular object of the present invention to provide an improved apparatus for measuring relative speed between a fluid and a reference which is operative without directly engaging the fluid under measurement.

In accordance with the present invention, there is provided apparatus for measuring the relative speed of movement between a reference and a fluid, the apparatus comprising: an electro-acoustic transducer coupled to the reference in communication with the fluid; an acoustic-electro transducer coupled to the reference in communication with the fluid and spaced from the electro-acoustic transducer; and a bandpass filtered amplifying circuit having an input coupled to the acoustic-electro transducer and an output coupled to the electro-acoustic transducer, the amplifying circuit, the electro-acoustic transducer, the acoustic-electro transducer and the fluid forming a regenerative loop producing a speed indicative regenerative frequency signal.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENTS OF THE INVENTION

By way of overview, the descriptions of the embodiments of the present invention set forth below are best understood by initially understanding that the invention uses a closed loop system in which a signal is propagated through a fluid from a speaker to a microphone in the form of acoustic energy. The microphone signal is filtered, amplified and reapplied to the speaker. It is fundamental to the inventive system to understand that the time delay imposed on the signal traveling from the speaker to the microphone establishes the frequency of regeneration for the loop. It is also important to realize that this time delay changes when the craft or fluid move which in turn changes the regenerative frequency.

Figure 1:
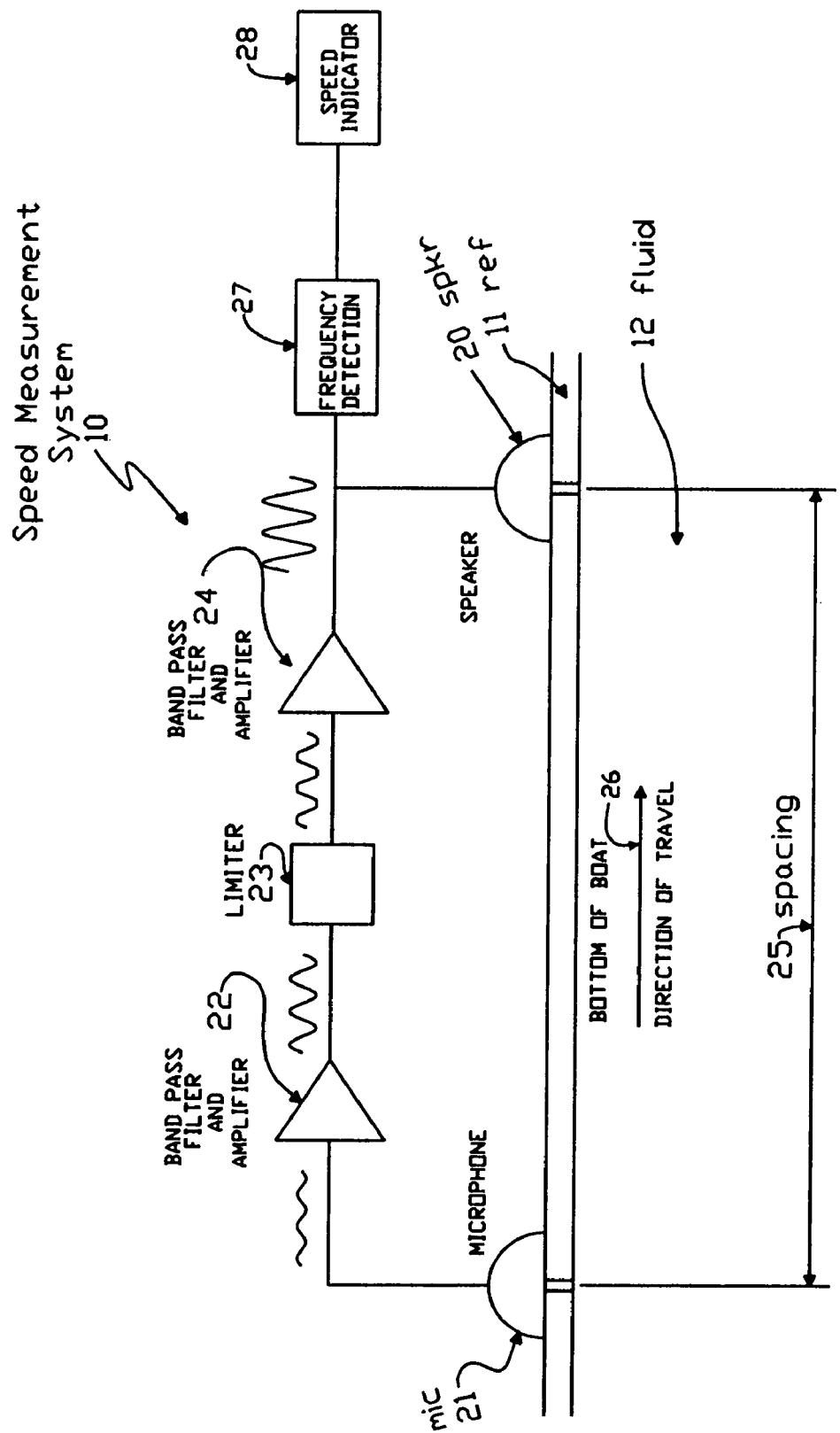
FIG. 1 sets forth a block diagram illustrative of the basic operation of an apparatus and method for measuring relative speed between a fluid and a reference.

FIG. 1 sets forth a block diagram of a speed measurement system constructed in accordance with the present invention and generally referenced by numeral 10. Speed measurement system 10 includes a microphone 21 and a speaker 20 coupled to a reference 11 in a spaced-apart relationship defining a spacing 25 therebetween. Microphone 21 is coupled to a bandpass filter and amplifier 22, the output of which is coupled to a limiter 23. The output of limiter 23 is coupled to a bandpass filter and amplifier 24. Bandpass filter and amplifiers 22 and 24 are also referred to below as "bandpass amplifier" or simply "amplifier". The output of amplifier 24 is coupled to speaker 20 and frequency detector 27. The output of frequency detector 27 is coupled to a speed indicator 28. The combination of microphone 21, bandpass amplifier 22, limiter 23, bandpass amplifier 24, speaker 20 and fluid 12 form a closed-loop system in which electrical signals applied to speaker 20 are converted to sound energy which in turn is imparted to fluid 12. The sound energy imparted to fluid 12 propagates from speaker 20 outwardly through fluid 12. A portion of the sound energy within fluid 12 reaches microphone 21 and is reconverted to electrical signals. The electrical signals outputted by microphone 21 are amplified by bandpass amplifier 22 and applied to limiter 23. Limiter 23 performs an amplitude limiting function to convert the output of bandpass amplifier 22 from a sine wave to a truncated sine wave signal which is further amplified by bandpass amplifier 24. The filter characteristic of bandpass amplifier 24 converts the truncated sine wave back to a sine wave signal which in turn is applied to speaker 20. Once again, speaker 20 converts the applied signal from bandpass amplifier 24 to sound energy imparted into fluid 12. As signals circulate through system 10, they are amplified, filtered, converted to sound energy, reconverted to electrical signals and so on in a process which is capable of regeneration for signals having frequencies within the bands of the bandpass filters. The frequency of signals within system 10 is detected by detector 27 and displayed as speed by speed indicator 28. The explanation and descriptions which follow are best understood in light of a basic operating principle of the present invention system which simply stated provides that the frequency of the signal generated within the system loop is a function of the delay time of signals traveling between speaker 20 and microphone 21. Thus, any signal generated by speaker 20 will be fed back to speaker 20 through the circuit after experiencing time delay imposed by the transit time of the signal through fluid 12. As a result, the signal will be repetitive with a period determined by this time delay. Stated differently, any signal will be repetitive with a period equal to the total delay in the entire circuit loop. In the embodiment of FIG. 1, the loop includes speaker 20, fluid 12 between speaker 20 and microphone 21, microphone 21, bandpass amplifier 22, limiter 23 and bandpass amplifier 24. Without the bandpass filters of amplifiers 22 and 24, any signal would regenerate in this manner. However, the filter characteristics of bandpass amplifiers 22 and 24 limit the generated signal to the filter fundamental (or single harmonic).

In the marine embodiment of the present invention shown in FIG. 1, the time delay of sound energy traveling through fluid 12 from speaker 20 to microphone 21 is a function of the speed of sound though water and the speed of craft through the water. This time delay through the water together with the frequencies of bandpass amplifiers 22 and 24 results in regeneratively amplifying frequencies that exhibit an odd multiple of the regenerative signal wavelength. The relationship between the time delay of signals propagating from speaker 20 to microphone 21 imposed by fluid 12 and the spacing between speaker 20 and microphone 21 forms an important element of the present invention system.

For purposes of explanation, it is assumed initially that no movement between reference 11 and fluid 12 is occurring. In the operation of speed measurement system 10, the loop gain of system 10, the filter characteristics of bandpass amplifiers 22 and 24, and the distance between speaker 20 and microphone 21 (spacing 25) together with the speed of sound traveling through fluid 12 combine to impose a frequency range upon signals within which the total loop gain of system 10 is greater than one causing system 10 to be regenerative for a signal frequency. This regenerative characteristic causes system 10 to amplify noise energy having a frequency component within the set of filtered frequencies to a far greater extent. As noise energy within this frequency range is circulated and amplified within the loop, regeneration is sustained and the system becomes self generating.

With the foregoing understanding of this relationship between the signal delay imposed upon sound energy passing from speaker 20 to microphone 21 and the frequency of signal regeneration of the loop, the use of the present invention as a speed measurement device may be understood. When reference 11 moves through fluid 12, or vice versa, the relative movement between reference 11 and fluid 12 changes the time delay imposed upon the sound energy propagating through fluid 12 between speaker 20 and microphone 21 which in turn changes the frequency of signals for which the above-mentioned odd multiple phase relationship exists. If the motion moves microphone 21 toward speaker 20 (i.e. arrow 26 in FIG. 1), the time delay is reduced and regenerative frequency is increased. Conversely, if the motion moves microphone 21 away from speaker 21 (against arrow 26), the time delay is increased and loop frequency is reduced.

System 10 is regenerative solely for signal frequencies which produce this phase relationship for signals propagating between speaker 20 and microphone 21. As a result, motion induced changes in signal time delay cause system 10 to regenerate at a frequency which satisfies the above phase relationship. Since time delay is a function of relative speed between reference 11 and fluid 12, detection of the frequency of regenerating signal by frequency detector 27 within system 10 may be used to measure the relative speed of relative movement between fluid 12 and reference 11 which is then displayed by speed indicator 28.

It is important to note that system 10 responds to relative speed of movement between fluid 12 and reference 11. Thus, the present invention system is operative whether fluid 12 moves and reference 11 is stationary or conversely whether fluid 12 is stationary and reference 11 moves. Therefore, the present invention system is equally operative to measure the relative speed of a moving fluid such as a fluid moving through a pipe or to measure the relative speed of an aircraft or water craft moving through a fluid such as air or water.

For purposes of illustration but limitation, the discussions of the various embodiments of the present invention system set forth below provide examples of the present invention system utilized in a marine environment. That is to say, in the discussions below reference 11 comprises the hull of a watercraft while fluid 12 comprises a body of water. Once again, it will be understood that the present invention system is not limited to a marine environment.

With continued reference to FIG. 1, reference 11 comprises a portion of a water craft or boat hull while fluid 12 comprises a body of water through which reference 11 is moving. By way of further illustration, it is assumed in this discussion of FIG. 1 that reference 11 is moving in the direction indicated by arrow 26. As the boat hull moves, energy received at microphone 21 is coupled to bandpass amplifier 22. In accordance with the above-described operation of amplifier 22, having signal components within the bandpass filter of amplifier 22 are amplified while components outside the bandpass filter of amplifier 22 are not amplified. The amplified noise signals from amplifier 22 are applied to limiter 23. Limiter 23 converts the applied signals to a truncated sine wave signal having the same frequency as the noise signal amplified by bandpass amplifier 22. This truncated sine wave signal is applied to bandpass filter and amplifier 24. Once again the signal components in the output of limiter 23 which are within the bandpass filter of amplifier 24 are further amplified by amplifier 24 and coupled to speaker 20. Speaker 20 converts the applied signals to acoustic or sound energy which is imparted to the water comprising fluid 12. As the sound energy output of speaker 20 propagates through the water comprising fluid 12, a portion of the sound energy is received by microphone 21. The process continues in a closed loop fashion as system 10 regenerates.

As reference 11 moves through fluid 12 in the direction indicated by arrow 26, the delay imposed upon sound energy leaving speaker 20 and reaching microphone 21 is reduced relative to the delay imposed when the boat and water are not moving relative to each other. In effect, as reference 11 moves in the direction indicated by arrow 26, microphone 21 moves toward speaker 20 relative to sound energy within fluid 12. This movement reduces the time delay for sound energy traveling from speaker 20 to microphone 21. The extent of change in the signal delay is proportional to the relative speed between reference 11 and fluid 12. In the example of a marine environment, the speed of the boat comprising reference 11 relative to the water comprising fluid 12 through which the boat is moving may be measured by detecting the frequency of regenerating signals within speed measurement 10. As the boat travels faster relative to the water, the time delay of sound energy traveling from speaker 20 to microphone 21 is further reduced which in turn further changes the regenerative frequency. Conversely, as the boat travels more slowly, the time delay is reduce from its stationary frequency by a lesser amount. The present invention system reads the frequency or regeneration compared to its stationary regenerative frequency and displays a speed output.

Figure 2:
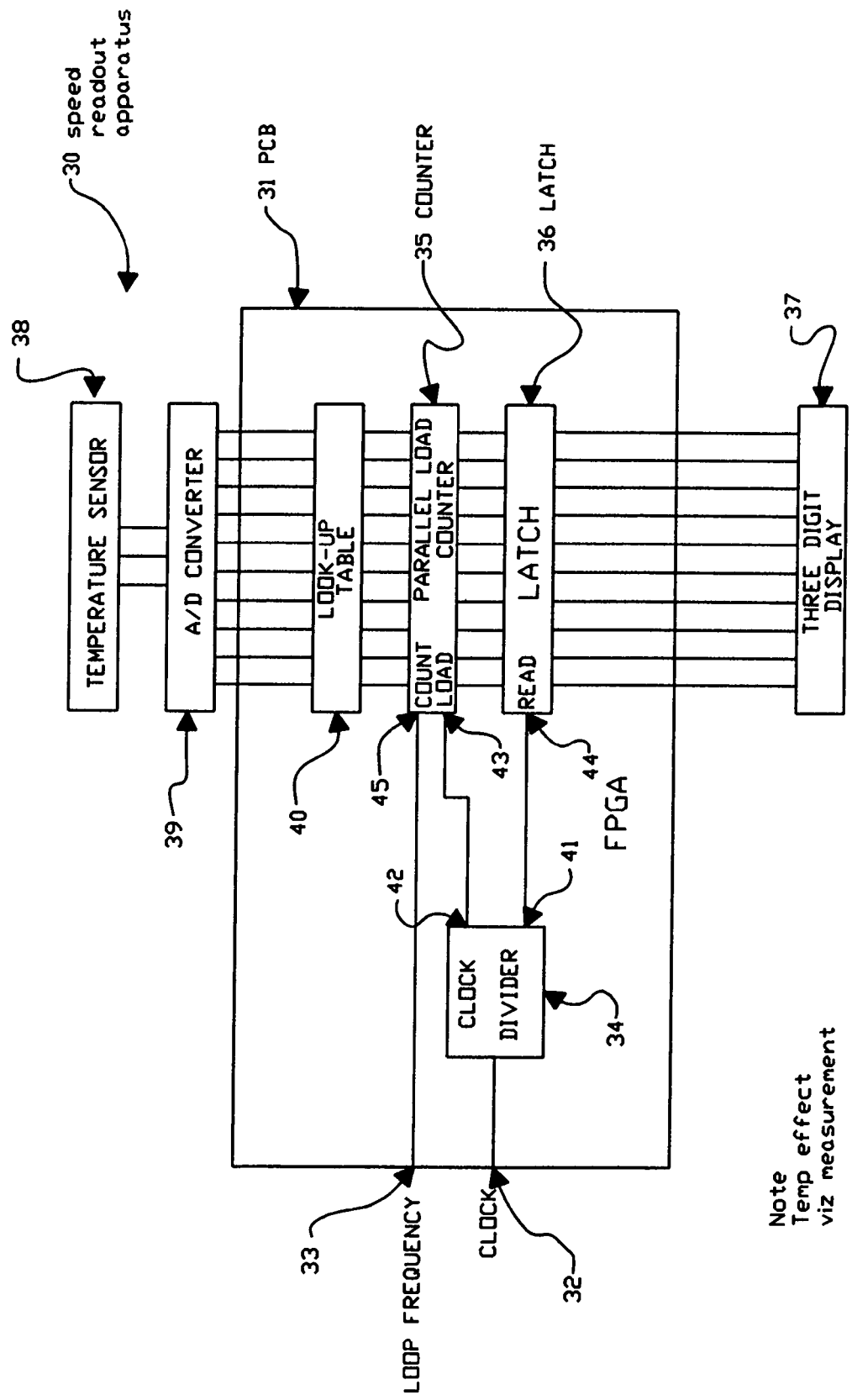
FIG. 2 sets forth a block diagram of the frequency counting and speed readout apparatus of the present invention apparatus and method for measuring relative speed between a fluid and a reference.

FIG. 2 sets forth a block diagram of the frequency counting and speed readout apparatus of the present invention apparatus and method for measuring relative speed between a fluid and a reference generally referenced by numeral 30. Apparatus 30 utilizes a supporting surface such as a conventional printed circuit board 31 upon which a parallel load counter 35 together with a look-up table 40 and a parallel latch 36 is supported. A clock divider 34 supported upon printed circuit board 31 includes a clock input 32 and a pair of outputs 41 and 42 coupled to latch 36 and counter 35 respectively. Output 42 is coupled to the load input 43 of counter 36 while output 41 is coupled to the read input 44 of latch 36. A count input 45 of counter 35 is coupled to a loop frequency signal input 33. Clock divider 34 is operatively coupled to a source of clock signal 32 (not shown). A temperature sensor 38 is operatively coupled to an analog to digital converter 39 (A/D converter 39). The output of converter 39 is coupled to a look-up table 40. The output of latch 36 is coupled to a digit display 37.

In operation, the clock signal applied to input 32 of speed readout apparatus 30 is divided by clock divider 34 into a load signal at output 42 and a read signal at output 41. Concurrently, the regenerative signal produced within the loop of the present invention speed measurement system (such as system 10 shown in FIG. 1) is applied to input 33 of circuit 30 and is further coupled to count input 45 of counter 35. In response to a load signal at input 43 produced by clock divider 34, counter 35 begins counting the loop frequency signal at input 45. The division of clock signal within clock divider 34 sets up a count interval during which time this count accumulates within counter 35. Following the desired count interval, clock divider 34 produces an output signal at output 41 which is applied to read signal 44 of latch 36. In response to this read signal, the current count within latch 36 is applied to digital display 37 producing a speed readout which is viewable by the user. Following the initiation of a readout of latch 36, clock divider 34 produces a signal which resets counter 35 and the process repeats. As the sequential process of counting the loop frequency signal inputs for a predetermined count interval and periodically latching the count into digital display 37 is repeated, a speed reading indicative of the relative speed between the boat and the water through which its moving is shown at display 37.

Temperature sensor 38, A/D converter 39 and look-up table 40 cooperate to provide temperature compensation for speed readout apparatus 30. As is well known, the speed of sound through a fluid such as water is in part a function of the water temperature. Thus, in the system example shown in FIG. 1, the accurate speed reading requires compensating for the water temperature. Accordingly, temperature sensor 38 produces a temperature signal output which is converted by A/D converter 39 to a digital signal. This digital signal is coupled to a look-up table 40, the output of which is applied to counter 35. The output of the look-up table, for each measured temperature, is the compliment of the reading that would have been read for zero speed. Thus the counter is preloaded to a negative value of the count that would obtain when there was no motion. This value is preloaded into the counter and then the loop frequency is counted for a specified time. The end result of the count is a number that is directly related to the speed of the boat.

In several embodiments of the present invention such as the embodiment shown in FIG. 3 below, an alternative computational model is utilized in which the need for temperature sensing and compensation is avoided. This process is described below in FIG. 3 in greater detail. However, suffice it to note here that the need for temperature compensation is avoided by utilizing processing which nulls out the temperature factor in its effect upon the speed of sound within the water.

Figure 3:
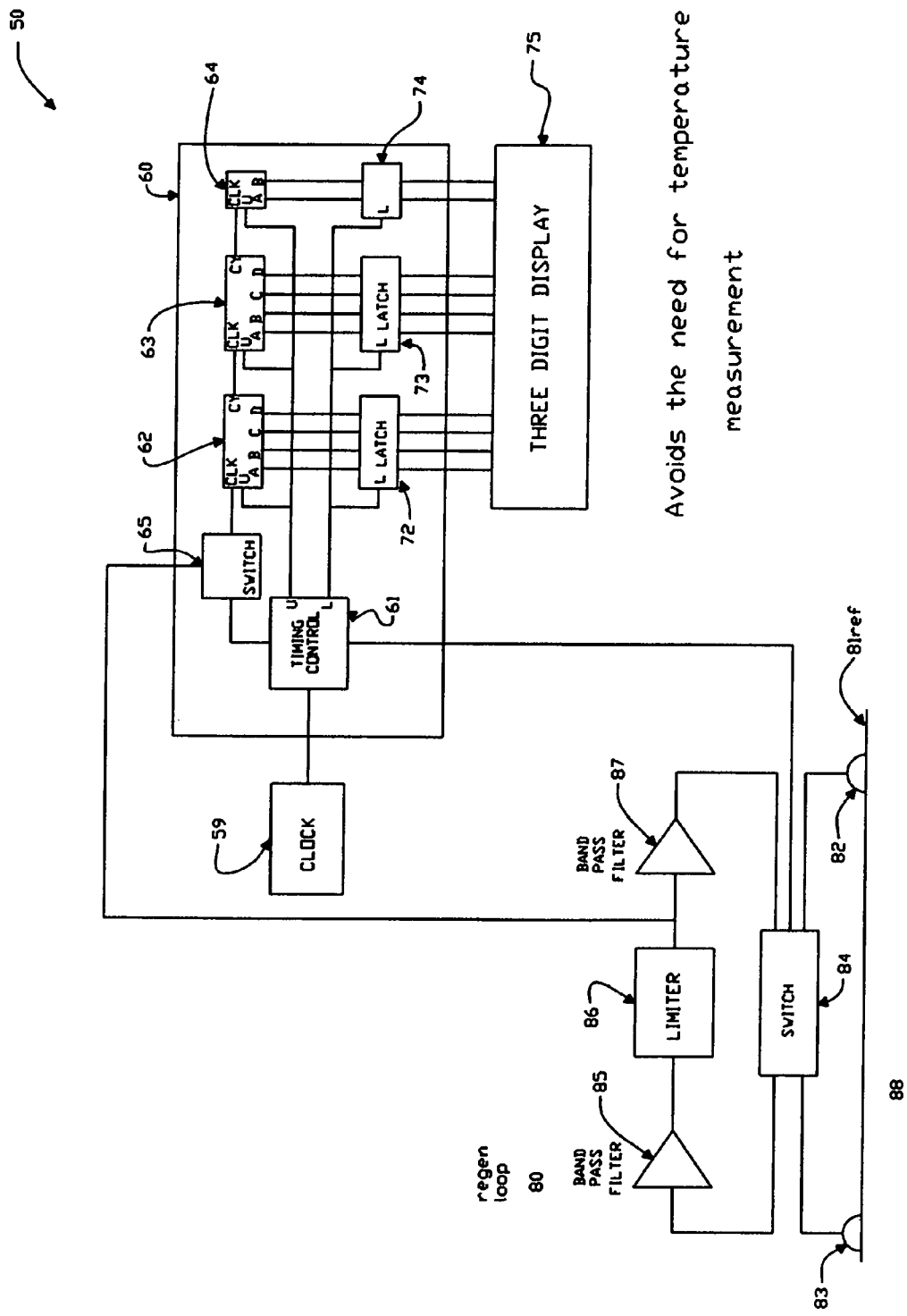
FIG. 3 sets forth a block diagram of an alternate embodiment of the present invention apparatus and method for measuring relative speed between a fluid and a reference which utilizes a pair of bilateral transducers and switching arrangement.

FIG. 3 sets forth a block diagram of an alternate embodiment of the present invention apparatus and method for measuring relative speed between a fluid and a reference which utilizes a pair of bilateral transducers and switching arrangement and which is generally referenced by numeral 50. Speed measurement apparatus 50 includes a speed readout apparatus 60 together with a reversible regenerative loop 80. Regenerative loop 80 is constructed in general conformity with speed measurement system 10 shown in FIG. 1 with the further improvement of a pair of bilateral transducers 82 and 83 replacing speaker 20 and microphone 21 (shown in FIG. 1). Transducers 82 and 83 are supported upon a reference 81 which, in the example shown in FIG. 3, comprises a boat hull. Boat hull 81 is moving through a body of water 88.

In accordance with the above-described operation of the regenerative loop of the present invention speed measurement system, a bandpass amplifier 85 is operatively coupled to a comparator 86 which in turn is operatively coupled to a second bandpass amplifier 87. The basic function of bandpass amplifiers 85 and 87 together with limiter 86 remains essentially the same as the above-described operation of bandpass amplifier 22 and 24 together with limiter 23 (shown in FIG. 1). The embodiment of FIG. 3 departs from the embodiment shown in FIG. 1 in that the output of bandpass amplifier 87 is coupled to a switch 84. Similarly, the input to bandpass amplifier 85 is also coupled to switch 84. Transducers 82 and 83 are each coupled to switch 84. In accordance with the preferred fabrication of the embodiment shown in FIG. 3, transducers 82 and 83 are bilateral electro-acoustic transducers. In essence, this means that each transducer is capable of operating as a speaker or a microphone. Thus, each of transducers 82 and 83 converts sound energy impacting the transducer to a corresponding electrical signal and conversely converts electrical signals applied thereto to sound energy communicated into water 88.

Switch 84 provides switched connection of the input to bandpass amplifier 85 to either of transducers 82 or 83. Similarly but oppositely, switch 84 provides switchable coupling between the output of bandpass amplifier 87 and transducers 82 and 83. As a result, in one switch condition, switch 84 couples the input of bandpass amplifier 85 to transducer 83 while coupling the output of bandpass amplifier 87 to transducer 82. Under this condition of switch 84, the operation of regenerative loop 80 is carried forward utilizing transducer 82 as a speaker while utilizing transducer 83 as a microphone. With switch 84 in the opposite switch condition, the input to bandpass amplifier 85 is coupled to transducer 82 while the output of bandpass amplifier 87 is coupled to transducer 83. In this switch configuration, transducer 83 functions as the speaker while transducer 82 functions as the microphone.

In accordance with an important advantage of the embodiment of the present invention shown in FIG. 3, the ability to alternately change switch 84 between its switched conditions allows transducers 82 and 83 to alternately perform as speaker and microphone. This in turn alters the direction of sound propagation within water 88 and negates the effect of temperature variations within water 88.

Generally speaking, speed readout apparatus 60 utilizes multiple clocks and multiple latches to individually control the three digit display inputs for display 75.

More specifically, speed readout apparatus 60 includes a timing control 61 having a clock 59 coupled thereto. Speed readout 60 further includes a plurality of decade counters 62, 63 and 64 each having an upcount/downcount input coupled to timing control circuit 61. Correspondingly, speed readout apparatus 60 includes a plurality of latches 72, 73 and 74 coupled to the outputs of counters 62, 63 and 64 respectively. The outputs of latches 72, 73 and 74 are coupled to the inputs of a three digit display 75. A switch 65 is operatively coupled to regenerative loop 80 to provide a regenerative speed indicating input signal for processing by speed readout 60. In operation, when switch 84 is to the position where transducer 83 is in the transmit mode and transducer 82 is in the receive mode, counters 62, 63 and 64 are initially set to zero and then put in a count down mode. After a specified time the timing control 61 reverses the state of switch 84 changing the status of transducers 83 and 84. The counters 62, 63 and 64 are switched to count up for the same specified time. Thus the counters at this point contain the difference of the two counts and the outputs are latched into latches 72, 73 and 74.

Figure 4:
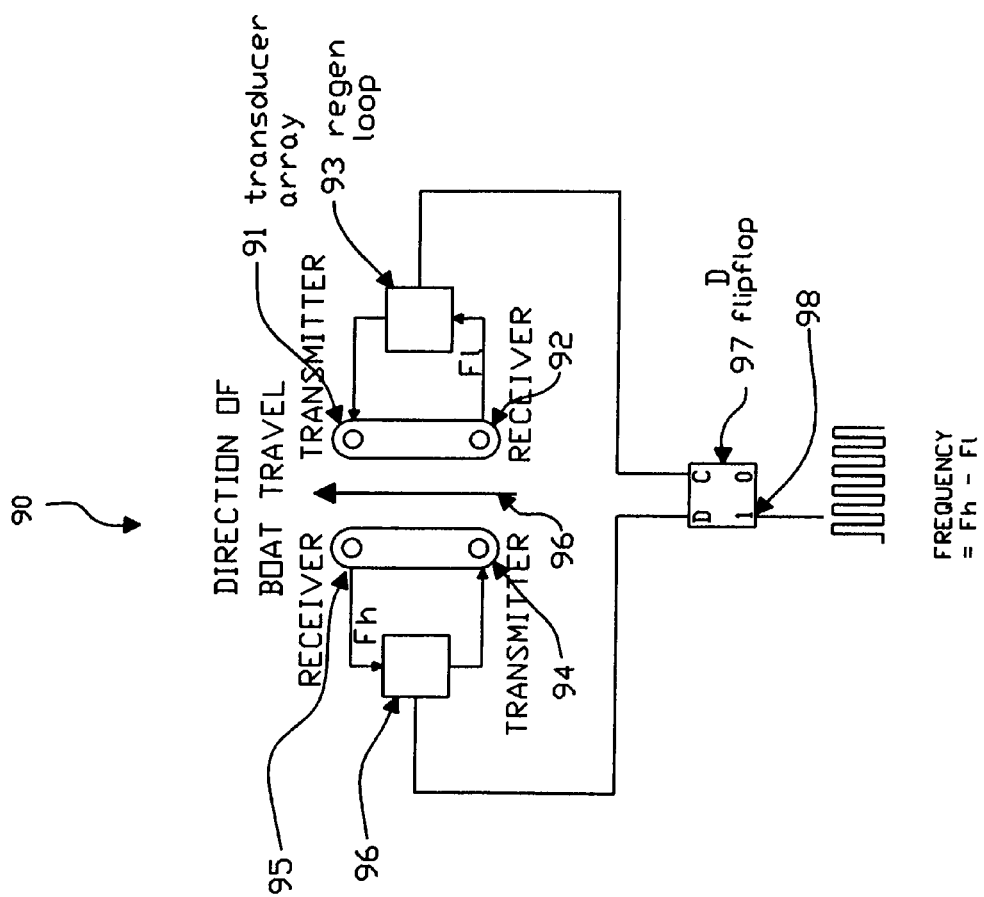
FIG. 4 sets forth a block diagram of a still further alternate embodiment of the present invention apparatus and method for measuring relative speed between fluid and a reference utilizing two oppositely positioned transmitting and receiving transducer pairs.

FIG. 4 sets forth a multiple transducer array generally referenced by numeral 90 having oppositely posed transducer pairs which are operative upon a common fluid having a direction of travel indicated by arrow 96. By way of overview, the embodiment shown in FIG. 4, utilizes two regenerative loop speed measurement apparatus fabricated in accordance with the apparatus set forth above in FIGS. 1 through 3. Thus, a regenerative loop speed apparatus 93 is operatively coupled to a speaker 91 and a microphone 92 and is operational in the manner described above in FIG. 1. Transducer array 90 further includes a second regenerative loop speed measurement apparatus 96 constructed in accordance with the structure set forth above in FIGS. 1 through 3. Thus, regenerative loop speed measurement apparatus 96 includes a speaker 94 coupled to loop 96 and a microphone 95 also coupled to loop 96 in a configuration similar to system 10 shown in FIG. 1. Of importance with respect to the embodiment shown in FIG. 4, is the opposite positions of transmitting and receiving transducers relative to the common direction of water travel indicated by arrow 96. In accordance with the above-described operation, regenerative loop speed measurement apparatus 93 and 96 operate as described above to produce speed indicative output signals which are applied to the D and C inputs of a D flip flop 97. The output of flip flop 97 at output 98 is a square wave signal proportional to the relative speed. It has been found that this frequency also corresponds to the difference between individual regenerative loop frequency signals.

It will be apparent to those skilled in the art that transducer devices have been developed that are capable of input and output functions at the same time. It will be equally apparent to those skilled in the art that such devices may be utilized in the present invention system. For example, it will be apparent that the embodiment shown in FIG. 3 may benefit from the use of such transducers in place of transducers 82 and 83.

It will be further apparent to those skilled in the art that the embodiment set forth in FIG. 4 may be implemented by using a single set of transducers using each transducer to send and receive separate frequencies. For example, the system may use the third harmonic in one direction and the fifth harmonic in the other direction. In this manner, the need for two sets of transducers is avoided since each transducer is able to send at one frequency and receive at the other frequency.

What has been shown is a novel apparatus and method for measuring relative speed between a fluid and a reference. The inventive system finds application in a variety of environments such as fluid flowing through a stationary pipe or conversely a moving craft traveling through or upon a fluid. The inventive system avoids engaging the fluid and produces its speed indication without the need of directly engaging the fluid in the manner characteristic of prior art systems.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. Apparatus for measuring the relative speed of movement between a reference and a fluid, said apparatus comprising:
    an electro-acoustic transducer coupled to said reference in communication with said fluid having means for imparting acoustic energy into said fluid;
    an acousto-electric transducer coupled to said reference in communication with said fluid and spaced from said electro-acoustic transducer having means for receiving acoustic energy from said fluid;
    a bandpass filtered amplifying circuit having an input coupled to said acousto-electric transducer and an output coupled to said electro-acoustic transducer, said bandpass filtered amplifying circuit, said electro acoustic transducer, said acousto-electric transducer and said fluid forming a closed loop defining a loop gain and loop passband within which noise occurs, said closed loop regenerating in response to noise within said closed loop which has frequency components within said loop passband producing a regenerative signal having a frequency which is determined by the relative speed of movement between said reference and said fluid; and
    means for measuring the frequency of signal produced within said regenerative loop when it regenerates to provide a speed-indicative output.

2. The apparatus set forth in claim 1 wherein said bandpass filtered amplifying circuit includes:
    a first bandpass amplifier having a first bandpass amplifier input coupled to said acousto-electric transducer and a first bandpass amplifier output; and
    a limiter coupled to said first bandpass amplifier output.

3. The apparatus set forth in claim 2 wherein said bandpass filtered amplifying circuit includes: a second bandpass amplifier having a second bandpass amplifier input coupled to said limiter and a second bandpass amplifier output coupled to said electro-acoustic transducer.

4. The apparatus set forth in claim 1 wherein said means for measuring includes:
    a frequency detector having an input coupled to said loop and an output; and
    speed indication means coupled to said output for converting the frequency detected to a speed-indicative readout.

5. A method of measuring the relative speed of movement between a reference and a fluid, said method comprising the steps of:
- providing a reference in contact with and movable within said fluid;
- providing first and second spaced apart transducers supported by said reference in communication with said fluid;
- providing an amplifier coupled between said first and second transducers having a signal gain;
- coupling a bandpass filter to said amplifier causing said amplifier to exhibit greater gain for signals having frequency components within said bandpass filter;
- said first and second transducers, said amplifier, said bandpass filter and said fluid forming a closed loop circuit which defines a loop passband and which is regenerative solely to signal frequencies within said loop passband, said regenerative frequency being determined by the relative speed of said fluid; and
- detecting the frequency of said regeneration for use as an indication of relative speed of movement between said fluid and said reference.

6. The method set forth in claim 5 further including the steps of:
- providing a switch coupled said first and second transducer; and
- operating said switch to interchange the signal couplings to said first and second transducers.

7. The method set forth in claim 5 wherein said fluid is water and wherein said reference is a watercraft moving through said water.

8. Speed measurement apparatus for measuring the relative speed of movement between a reference and a fluid, said apparatus comprising:
- a pair of spaced-apart transducers supported by said reference and coupled to said fluid each having means for transferring energy between said transducers through said fluid subject to a time delay;
- a regenerative circuit coupled between said transducer, said circuit including frequency filtering means and amplifying means, said circuit having signal gain but no signal producing source; and
- frequency detecting means coupled to said regenerative circuit producing a frequency-dependent speed-indicative output,
- said pair of transducers, said regenerative circuit and said fluid forming a regenerative loop through which a regenerated signal travels at a frequency determined in part by said time delay.

9. The speed measurement apparatus set forth in claim 8 wherein said frequency filtering means and said amplifying means includes at least one bandpass amplifier.

10. The speed measurement apparatus set forth in claim 8 wherein said regenerative circuit includes a limiter for limiting signal amplitude.

11. The speed measurement apparatus set forth in claim 8 further including alternating switch means coupled to said pair of transducers to alternate the direction of energy transfer through said fluid.

12. The speed measurement apparatus set forth in claim 8 wherein said fluid is a body of water and said reference is a watercraft movable therethrough.

13. A method of measuring the relative speed of movement between a reference and a fluid; said method comprising the steps of:
- forming a closed loop system having a loop gain and a loop bandpass and a loop component formed by an electro-acoustic transducer, an acousto-electric transducer and said fluid therebetween;
- allowing said closed loop system to regenerate and produce a regeneration signal;
- propagating said regeneration signal as acoustic energy in said fluid between said electro-acoustic transducer and said acousto-electric transducer;
- said fluid imposing a time delay upon said acoustic energy;
- amplifying and filtering said regeneration signal in a regenerative frequency selective manner to produce a regenerative signal having a frequency dependent upon said time delay; and
- detecting said regenerative frequency to measure said speed.

* * * * *